Nov. 25, 1941.  O. A. BROWN  2,263,758
PIN TAP
Filed July 8, 1940
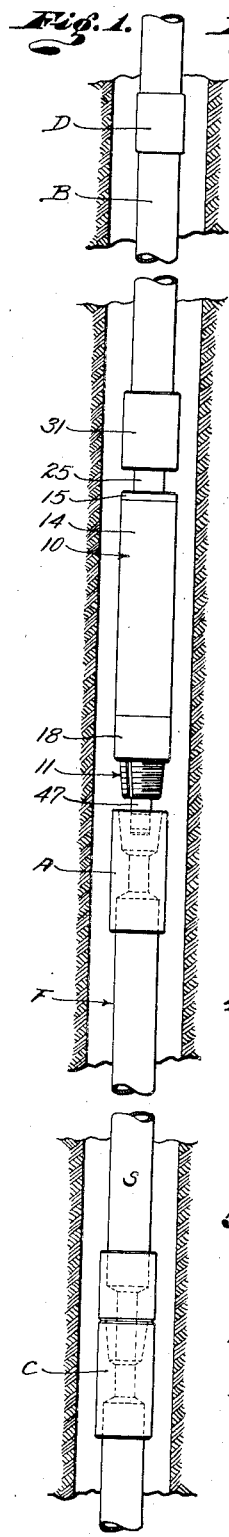
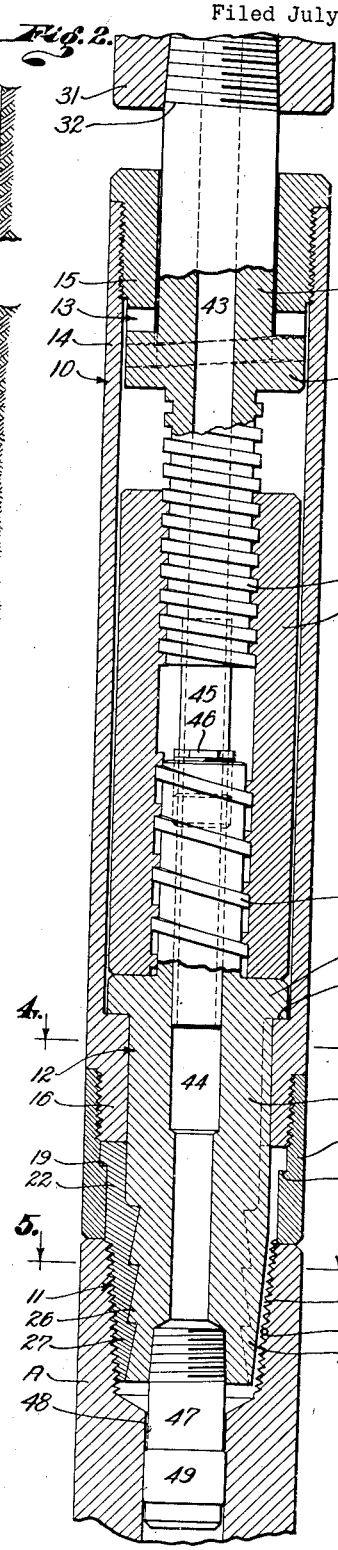
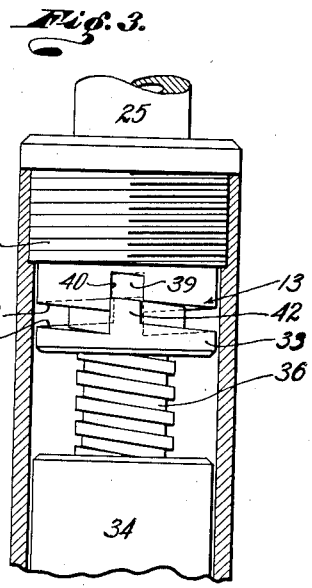
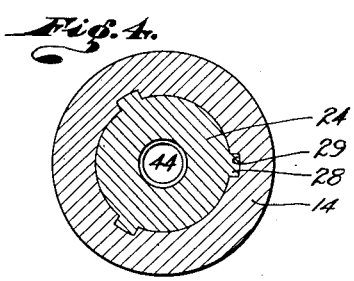
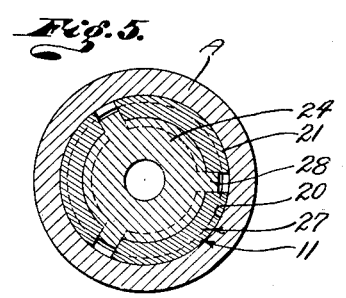
Inventor
ORA A. BROWN
By
His Attorney Patented Nov. 25, 1941

2,263,758

UNITED STATES PATENT OFFICE 2,263,758

PIN TAP

Ora A. Brown, Montebello, Calif., assignor to Baash-Ross Tool Company, Los Angeles, Calif., a corporation of California Application July 8, 1940, Serial No. 344,351

17 Claims. (Cl. 294—96)

This invention relates to well tools and relates more particularly to fishing tools useful in recovering objects from wells. A general object of this invention is to provide an effective and dependable pin tap that may be readily released in the event the lost object or fish cannot be withdrawn from the well.

In deep well drilling operations a string of pipe sometimes becomes caught in the well. Where attempts to withdraw the entire pipe string as a unit have failed it is the usual practice to unthread a portion of the string from the upper end of the well so that the portion thus freed may be recovered. This leaves a portion of the string in the well which must be recovered by fishing operations. Frequently the remaining portion of the pipe string fits the well so closely that it is impossible or at least inadvisable to employ an overshot or similar fishing tool. In such cases it becomes necessary to employ what is known as a pin tap, which is a fishing tool designed to thread into the upper end of the fish.

Another object of this invention is to provide a pin tap operable to obtain a firm, dependable engagement with the fish for the purpose of either unthreading the fish or withdrawing the fish as a unit.

Another object of this invention is to provide a pin tap having tap slips that may be readily threaded into the fish and then expanded to obtain a strong, positive, engagement with the fish for the purpose of withdrawing the fish or unthreading a portion of the fish, which slips may be contracted and unthreaded without endangering or loosening the threaded connections of the fishing string in the event the fish cannot be recovered or backed off.

Another object of this invention is to provide a novel and particularly effective inclined plane means for controlling the slips and for holding the slips in the expanded condition in firm engagement with the fish.

Another object of this invention is to provide a pin tap embodying slips expansible by wedge parts inclined with respect to the longitudinal axis of the tool and screw thread means having threads operable to produce a rapid initial expansion of the slips and of sufficient helical pitch to be nonlocking when torque is applied and threads of smaller helical angle operable to produce the final or continued expansion of the slips with substantial mechanical advantage to assure a very tight engagement of the slips in the fish to resist unthreading and disengagement by vertical forces and rotation.

Another object of this invention is to provide a releasable pin tap of the character mentioned in which the tap slips may be expanded, contracted, and fully controlled without endangering the fishing string or unthreading the threaded connections of the fishing string.

A further object of this invention is to provide a releasable pin tap that is compact and sturdy in construction and that embodies means for conducting fluid under pressure to the fish so that circulation may be established to facilitate recovery of the fish.

The various objects and features of my invention will be fully understood from the following detailed description of a typical preferred form and application of the invention, throughout which description reference is made to the accompanying drawing, in which:

Fig. 1 is a fragmentary vertical sectional view of a portion of a well showing the pin tap of the present invention about to enter the fish in the well. Fig. 2 is an enlarged central longitudinal detailed sectional view of the pin tap showing the slips threaded in the fish and the upper mandrel in a partially raised position. Fig. 3 is a fragmentary vertical detailed sectional view with the mandrel and nut in side elevation showing the clutch means engaged for the transmission of right hand rotation and Figs. 4 and 5 are transverse detailed sectional views taken as indicated by lines 4—4 and 5—5, respectively, on Fig. 2.

The improved pin tap of the present invention may be said to comprise, generally, a body 10, tap slips 11 carried by the body 10 and adapted to be engaged in a fish F, means 12 for operating or expanding the slips 11 and a control 13 for facilitating the release of the slips.

The body 10 is in the nature of a shell or housing, being an elongate tubular assembly. In the construction illustrated the body 10 includes a main tubular section 14 and a guide sleeve or nut 15 threaded in the upper end of the section 14. The lower end portion 16 of the body section 14 is reduced in diameter to present an upwardly facing internal shoulder 17. A ring or collar 18 is threaded on the reduced portion 16. The collar 18 has an internal annular shoulder 19 facing upwardly to oppose the lower end of the portion 16.

The slips 11 are arranged at the lower end of the body 10 to engage in the fish F. In the typical use or application of the invention illustrated the fish F is a portion of a pipe string made up of sections S connected by threaded couplings C. The threads of the couplings C will be considered as righthand threads. As is usually the case the upper end of the lost pipe string or fish F has a tool joint section or coupling section A provided with an open upwardly facing screw-threaded socket 20. The slips 11 of the pin tap are wedge-like segments designed to engage and thread in the fish socket 20. The slips 11 are elongate members arranged in an annular or tubular series of three or more. As best illustrated in Fig. 5 of the drawing the slips 11 are arcuate in horizontal cross section having concave inner sides and convex outer sides. The outer sides of the slips 11 have thread portions 21 which register to form a righthand thread for mating with the thread on the wall of the socket 20. It is preferred to form and relate the slips 11 so that the thread made up of the thread portions 21 has a slightly smaller diameter than the thread on the wall of the socket 20 whereby slips 11 readily start and thread in the socket. The slips 11 are provided with shanks 22 which extend upwardly into the collar 18. Downwardly facing shoulders 23 on the slip shanks 22 rest on the shoulder 19. The upper ends of the shanks 22 engage against or oppose the lower end of the portion 16 so that the slips are constrained to move vertically with the body 10.

The means 12 for expanding or operating the slips 11 is a wedge means embodying an inclined plane or thread arrangement and a wedge structure. The means 12 includes a mandrel 24 in the lower portion of the body 10 and an upper mandrel 25 extending from the upper end of the body 10. The lower mandrel 24 shiftably passes through the restricted body portion 16 and extends downwardly into the slip assembly. Sets of vertically extending wedge parts 26 are provided on the mandrel 24 and cooperate with complementary wedge parts 27 on the inner sides of the slips 11. The active faces of the wedge parts 26 and 27 are inclined or pitched relative to the longitudinal axis of the tool so that the slips are expanded by relative longitudinal movement between the body 10 and the mandrel 12. In the drawing I have shown the slips 11 fully contracted.

The mandrel 24 and the slips 11 are keyed or splined to the body 10 so that rotation or torque may be better transmitted from the body to the slips. Spaced longitudinal splines 28 are provided on the mandrel 24 and slidably fit grooves 29 in the internal wall of the restricted body portion 16. The splines 28 may continue downwardly to the lower end of the mandrel 24 and are slidably received between the vertical edges of the slips 11 to key the slips to the mandrel. An annular enlargement or flange 30 is formed on the mandrel 24 and is spaced between the ends of the mandrel. The lower face of the flange 30 is engageable with the shoulder 17 to limit the downward travel of the mandrel relative to the body 10.

The upper mandrel 25 of the means 12 slidably passes through the guide sleeve or nut 15 and its projecting upper end is adapted to be connected with a fishing string B. In the case illustrated the upper end of the mandrel 25 is threaded into a sub 31 on the lower end of the fishing string B. Where the threaded couplings C of the fish F have righthand threads the couplings D of the fishing string B have lefthand threads and the threads 32 connecting the mandrel 25 with the sub 31 are likewise lefthand threads. An annular flange 33 is formed on the mandrel 25 to move in the body section 14 with suitable clearance. The upper side of the flange 33 is formed to cooperate with the lower end of the nut 15 as will be later described. The inner or lower end of the mandrel 25 is spaced from and opposes the inner end of the mandrel 24.

The spaced opposing mandrels 24 and 25 are connected by an inclined plane means or screw-thread means to produce relative vertical movement between the mandrel 24 and the body 10 and to hold the mandrel 24 in a position where the slips 11 are expanded. A tube or tubular member 34 is arranged in the body section 14 and receives the opposing end portions of the mandrels 24 and 25. The member 34 is received in the body section 14 with suitable clearance. Threads 35 connect the mandrel 24 with the member 34 and threads 36 connect the mandrel 25 with the member 34. The threads 35 and 36 are pitched in the same direction as the threads of the fishing string B and in the case illustrated are pitched in the lefthand direction. The helical pitch of the threads 35 is substantial so that the threads are operable to produce rapid relative movement between the mandrel 24 and the body 10 when the slips 11 are anchored in the fish F. The threads 35 are preferably square threads and are formed and related to have substantial play or relative vertical movement so that the mandrel 25 and the sleeve 34 may be freely moved vertically relative to the body 10 during certain phases of operation. The clearance between the threads 35 is clearly illustrated in Fig. 2. The threads 36 have a smaller helical pitch than the quick threads 35 and mate or cooperate with working clearance only. The threads 36 are preferably square threads and quite heavy. The thread 35 of the mandrel 24 extends upwardly from the flange 30 and the thread 36 of the mandrel 25 extends downwardly from the flange 33.

It will be seen that with the slips 11 engaged in the socket 20, lefthand rotation of the mandrel 25 will cause contraction of the mandrels 24 and 25, that is, the mandrels will tend to thread into the member 34 so that the wedge parts 26 and 27 may cooperate to expand the slips 11. Righthand rotation of the mandrel 25 with the slips 11 engaged in the socket 20 will result in expansion or movement of the mandrels 24 and 25 with the result that the mandrel 24 will move downwardly so that the slips 11 are free for contraction. The steep or quick threads 35 are nonlocking when a substantial torque is transmitted through the tool for the unthreading operation. The steep threads 35 also provide for quick initial slip expansion and contraction while the threads 36 provide for slower but more powerful relative movement to assure the tighter engagement of the slips 11 in the socket 20 and the sure contraction of the slips. With the slips 11 tightly expanded in the socket 20 the threads 35 and 36 may serve to transmit rotation or torque to the mandrel 24 and the slips 11.

The control means 13 is a clutch mechanism provided primarily to assure the release or unthreading of the slips 11 when it is desired to free to tool from the fish F although it may serve to transmit rotation or torque between the mandrel 25 and the body 10 for other purposes. The control 13 is operable to connect the mandrel 25 with the body 10 for the transmission of both righthand and lefthand rotation. In the typical construction illustrated the control 13 includes cooperating parts on the guide sleeve or nut 15 and the mandrel flange 33. The lower end of the nut 15 is provided with two helically pitched surfaces 38 of slightly less than 180° each. Vertical or upwardly extending notches 39 occur between the ends of the helical surfaces 38. Because of the helical pitch of the surfaces 38 one wall of each notch 39 is of increased vertical extent to form a substantial longitudinal shoulder 40. The shoulders 40 face rearwardly relative to the righthand direction of rotation where the threads 35 and 36 are lefthand threads, as illustrated. In other words the surfaces 38 are pitched in the same direction as the threads 35 and 36 so that their joinder with the notches 39 provides for the long rearwardly facing shoulders 40.

The upper side of the flange 33 is provided with a pair of helical upwardly facing surfaces 41 opposing and complementary to the surfaces 38. Upstanding lugs 42 are provided between the ends of the surfaces 41. The lugs 42 are designed to enter the notches 39. Because of the helical pitch of the surfaces 41 the forward sides of the lugs 42, relative to the direction of righthand rotation, are longer than the trailing sides of the lugs. The forward sides of the lugs 42 are engageable with the shoulders 40 for the transmission of righthand rotation to the body 10 before the lugs are engaged in the notches 39 proper. With the lugs 42 engaged in the notches 39, by taking up the play in the threads 35, the means or control 13 is operable to transmit both lefthand and righthand rotation between the mandrel 25 and the body 10. The upper mandrel 25 is of course movable vertically relative to the body 10, the extent of this movement being determined or limited by the engagement of the sub 31 with the upper end of the nut 15 and the engagement of the surfaces 41 with the surfaces 38. The extent of relative movement between the mandrels 24 and 25 is at least as great as the extent of vertical movement of the mandrel 25 relative to the body 10 and the opposing ends of the mandrels never contact. It will be seen that the control 13 is engageable by relative vertical movement between the body 10 and the mandrel 25 to provide for the transmission of righthand rotation from the mandrel to the body and is engageable by further relative movement between the mandrel 25 and the body 10 for the transmission of both righthand and lefthand rotation.

The invention includes means for handling or conducting circulation fluid so that circulation may be established to aid in removing the fish. A longitudinal passage 43 is provided in the upper mandrel 25 and its upper end communicates with the tubular fishing string B. A similar longitudinal fluid passage 44 is provided in the lower mandrel 24. Means is provided for conducting fluid from the passage 43 to the passage 44. This means may comprise a wash pipe 45 threaded or otherwise secured and sealed in the lower end of the passage 43 and extending downwardly to enter the passage 44. A packing gland 46 is provided in the upper portion of the mandrel 24 to pack about the wash pipe 45. The wash pipe 45 is slidably received in the passage 44 and packing gland 46 and remains in the passage 44 under all operating conditions for the transmission of fluid to the passage. Means is preferably provided to discharge the circulation fluid into the fish F. A wash pipe 47 is secured in the lower end of the passage 44 and projects downwardly beyond the mandrel 24 to enter the passage 48 of the fish F. Packing 49 may be provided on the wash pipe 47 to seal with the wall of the passage 48.

In operation the tool is run into the well on the fishing string B with the slips 11 contracted and the upper and lower mandrels 24 and 25 extended. The tool is lowered to the fish F and the slips 11 are entered in the fish socket 20. The string B is turned to the right with some weight on the tool to engage the slips 11 in the socket 20 and to thread the slips in the socket. Rotation of the string B to the right with a suitable weight on the tool will either result in the transmission of the rotation through the mating threads 35 and 36 to the mandrel 24 or will cause upward movement of the mandrel 25 to engage the lugs 42 with the shoulders 40. In either case the righthand rotation is transmitted to the mandrel 24 and the slips 11 to thread the slips in the socket 20. When the slips 11 have been threaded in the socket 20 a suitable weight may be maintained on the tool and the string B is turned to the left to move the mandrels 24 and 25 toward one another. This contraction or relative movement of the mandrels 24 and 25 is caused by the cooperation of the threads 35 and 36. As the mandrel 24 moves upwardly during this action the wedge parts 26 cooperate with the wedge parts 27 to expand the slips 11. Instead of expanding the slips 11 in this manner a suitable tension or up-pull may be put on the fishing string B to raise the mandrel 24. This mode of operation may be preferable when the slips 11 have been effectively threaded in the socket 20 and when the lugs 42 are fully disengaged from the surfaces 38 and the shoulders 40. With the slips 11 threaded in the socket 20 and expanded in either of the two ways just described the slips have a firm immovable engagement with the fish F and the lower end of the collar 18 engages the upper end of the fish coupling member A.

Suitable steps are then taken to withdraw the fish F. The string B may be raised or pulled upwardly in an attempt to withdraw the entire fish F as a unit. In this case the up-pull is transmitted through the mandrel 25, the member 34 and the mandrel 24 to the slips 11 which are tightly engaged in the socket 20. Suitable fluid may be pumped through the fishing string B to discharge into the fish passage 48 to establish circulation through the fish. In the event the fish F cannot be withdrawn as a unit by pulling on the string B the string B may be jarred in an attempt to free or loosen the fish. In accordance with the usual practice the string B may be provided with a jarring tool or bumper sub (not shown) for the jarring operation. If the fish F is loosened or raised either by a simple up-pull on the string B or by jarring operations, the fish is withdrawn from the well.

In the event the fish F is not freed and recovered by the operations above described the string B may be turned to the left to back off the fish F. Lefthand rotation is transmitted from the mandrel 25 to the mandrel 24 through the threads 36 and 35 and the keys 28 transmit the torque to the slips 11. The lefthand torque threads the mandrel 25 down in the sleeve member 34 and the end of the sub 31 comes against the upper end of the nut 15 and as the lefthand rotation is continued the threads 36 cooperate to pull the mandrel 24 upwardly relative to the body 10 so that the slips 11 are further expanded and tightened in the socket 20. The slips 11 threaded and expanded in the socket 20 transmit the rotation to the fish F and in most cases the lefthand torque causes unthreading of one of the couplings C of the fish. With one of the couplings C unthreaded the portion of the fish thus freed may be withdrawn from the well with the fishing string B. In practice a substantial lefthand torque may be transmitted through the string B and the pin tap to the fish to bring about the disconnection of a coupling C of the fish.

In the event the fish F cannot be recovered or backed off by the above described operations it becomes desirable to disconnect the pin tap from the fish to permit recovery of the tool and fishing string. To disconnect or release the pin tap from the fish F the string B is turned to the right with a slight up-pull applied to the string. This righthand torque or rotation causes the threads 35 and 36 to move the mandrel 24 downwardly and the mandrel 25 upwardly. Downward movement of the mandrel 24 relative to the body 10 moves the wedge parts 36 down relative to the wedge parts 37 and the slips 11 are free to contract. In this connection it will be observed that the non-locking steeply pitched threads 35 may produce a quick and substantial downward movement of the mandrel 24 for the release of the slips 11. Upward movement of the mandrel 25 resulting from the righthand rotation of the string B brings the lugs 42 against the shoulders 38 and ultimately brings the lugs 42 against the shoulders 40. If the righthand rotation of the string B does not cause the above described downward movement of the mandrel 24, the string may be jarred or bumped down to free the wedge parts 26 from the wedge parts 27 for the contraction of the slips 11. With the mandrel 24 moved downwardly to permit contraction of the slip 11 the string B is raised a short distance to engage the lugs 42 in the notches 40. In some instances it may be necessary to turn the string B to the right to move the thread 35 of the member 34 relative to the thread 35 on the mandrel 24 to obtain the required clearance or freedom of movement. The clearance in the threads 35 provides sufficient upward movement of the mandrel 25 relative to the mandrel 24 to enter the lugs 42 in the notches 40. With the lugs 42 engaged in the notches 40 the string B is turned to the left to unthread the slips 11 from the socket 20. The lugs 42 engaged in the notches 40 transmit this lefthand rotation to the body 10 and the keys 28 transmit the lefthand rotation from the body 10 to the slips 11 so that the slips are unthreaded from the socket 20. When the slips 11 have been unthreaded from the socket 20 the fishing string B carrying the pin tap is withdrawn from the well.

It is to be particularly noted that the quick or steep threads 35 prevent locking or binding of the tool when a heavy lefthand torque is applied and provides for the rapid initial expansion of the slips 11 while the threads 36 provide for the final positive expansion of the slips. The threads 35 and 36 serve as torque transmitting elements for the transmission of rotation from the mandrel 25 to the mandrel 24 when the fishing string B is turned to the left or subjected to lefthand torque for the purpose of backing off the fish F. In other words the threads 35 and 36 serve to hold the parts in the positions where the slips 11 are fully expanded when the pin tap is being employed to unthread or back off the fish F. The clutch means or control 13 assures the transmission of lefthand rotation to the slips 11 when the slips are to be unthreaded from the fish and thus assures the ready release of the pin tap from the fish in the event the fish cannot be recovered or backed off.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. A well tool for engaging in a threaded opening of an object in a well comprising a set of slips for engaging in said opening, a body element carrying the slips, a wedge mandrel operable by vertical movement relative to the body to expand the slips in said opening, inclined plane means operable by rotation to produce relative vertical movement between the body and mandrel and operable to hold the body and mandrel against relative vertical movement with the slips expanded, and means separate from the inclined plane means for transmitting rotation from the string to the slips.

2. A well tool for use on a fishing string and adapted to engage in an opening in an object in the well, the tool comprising a set of slips for engaging in said opening, a body element carrying the slips, a wedge mandrel operable by vertical movement relative to the slips to expand the slips in said opening, screw thread means connecting the mandrel with the string for operation thereby and operable by torque applied through the string to hold the mandrel in the position where the slips are expanded, the screw threads of said means having clearance between their threads, and means engageable by taking up said clearance for transmitting torque from the string to the slips independently of the screw thread means.

3. A well tool for use on a fishing string and adapted to engage in an opening in an object in the well, the tool comprising a body element and a mandrel related for relative longitudinal movement, a set of slips adapted to enter said opening and carried by the body element for expansion in said opening upon relative longitudinal movement between the body element and the mandrel, thread parts on the slips for threading into said opening, and inclined plane means operable by rotation of the string to cause relative longitudinal movement between the body element and the mandrel to expand the slips and operable to transmit torque to the slips through the mandrel.

4. A well tool for use on a fishing string and adapted to engage in an opening in an object in the well, the tool comprising a body element and a mandrel related for relative longitudinal movement, a set of slips adapted to enter said opening and carried by the body element for expansion in said opening upon relative longitudinal movement between the body element and the mandrel, thread parts on the slips for threading into said opening, means for transmitting torque between the mandrel and slips, and cooperating inclined plane elements carried by the string and mandrel operable by turning of the string to cause relative longitudinal movement between the body element and the mandrel for the expansion of the slips and operable by torque on the string to retain the mandrel in the position where the slips are expanded so that torque may be transmitted to the object through the mandrel and slips.

5. A well tool for use on a fishing string and adapted to engage in an opening in an object in the well, the tool comprising a body element and a mandrel related for relative longitudinal movement, a set of slips adapted to enter said opening and carried by the body element for expansion in said opening upon relative longitudinal movement between the body element and the mandrel, thread parts on the slips for threading into said opening, means for transmitting torque between the mandrel and slips, cooperating inclined plane parts carried by the mandrel and string for transmitting rotation in one direction from the string to the mandrel to thread the slips in said opening and operable following expansion of the slips to transmit torque in the other direction for the unthreading of the object, and means for transmitting torque to the slips in said other direction independently of the inclined plane parts to unthread the slips from said opening.

6. A well tool for use on a fishing string and adapted to engage in an opening in an object in the well, the tool comprising a body element and a mandrel related for relative longitudinal movement, a set of slips adapted to enter said opening and carried by the body element for expansion in said opening upon relative longitudinal movement between the body element and the mandrel, thread parts on the slips for threading into said opening, means for transmitting torque between the mandrel and slips, cooperating inclined plane parts carried by the mandrel and string for transmitting rotation in one direction from the string to the mandrel to thread the slips in said opening and operable following expansion of the slips to transmit torque in the other direction for the unthreading of the object, and means for transmitting torque to the slips in said other direction independently of the inclined plane parts to unthread the slips from said opening, the last named means including engageable clutch parts on the string and body element, and means for transmitting torque between the body and mandrel.

7. A pin tap useful in recovering a threaded-together object from a well and adapted for use on a fishing string, the pin tap comprising a tubular body, tap slips on the lower portion of the body adapted to thread into the object and supported for expansion, a wedge mandrel shiftable relative to the body to expand the slips, an upper mandrel secured to the string and entering the upper end of the body, a tubular member receiving the opposing end portions of the mandrels, and pairs of mating threads on the mandrels and member pitched in the opposite direction to the threads of said object and operable by rotation of the string to cause movement of the wedge mandrel to expand and contract the slips.

8. A pin tap useful in recovering a threaded-together object from a well and adapted for use on a fishing string, the pin tap comprising a tubular body, tap slips on the lower portion of the body adapted to thread into the object and supported for expansion, a wedge mandrel shiftable relative to the body to expand the slips, an upper mandrel secured to the string and entering the upper end of the body, a tubular member receiving the opposing end portions of the mandrels, and pairs of mating threads on the mandrels and member pitched in the opposite direction to the threads of said object and operable by rotation of the string to cause movement of the wedge mandrel to expand and contract the slips, one of said pairs of threads having a steep helical pitch to cause rapid initial movement of the wedge mandrel.

9. A pin tap useful in recovering a threaded-together object from a well and adapted for use on a fishing string, the pin tap comprising a tubular body, tap slips on the lower portion of the body adapted to thread into the object and supported for expansion, a wedge mandrel shiftable relative to the body to expand the slips, an upper mandrel secured to the string and entering the upper end of the body, a tubular member receiving the opposing end portions of the mandrels, and pairs of mating threads on the mandrels and member pitched in the opposite direction to the threads of said object and operable by rotation of the string to cause movement of the wedge mandrel to expand and contract the slips, one of said pairs of threads having a steep helical pitch to cause rapid initial movement of the wedge mandrel, the other pair of threads having a smaller helical angle to assure a positive final movement of the wedge mandrel.

10. A pin tap useful in recovering a threaded-together object from a well and adapted for use on a fishing string, the pin tap comprising a tubular body, tap slips on the lower portion of the body adapted to thread into the object and supported for expansion, a wedge mandrel shiftable relative to the body to expand the slips, an upper mandrel secured to the string and entering the upper end of the body, means for connecting the body, wedge mandrel and slips against relative turning, inclined parts carried by the mandrels, pitched in the opposite direction to the threads of the object, operable by rotation of the string to move the wedge mandrel to expand the slips and thereafter adapted to transmit torque in one direction for the purpose of unthreading the connections of the object, and clutch parts on the body and upper mandrel engageable for the transmission of torque in the other direction to unthread the slips from the object.

11. A pin tap useful in recovering a threaded-together object from a well and adapted for use on a fishing string, the pin tap comprising a tubular body, tap slips on the lower portion of the body adapted to thread into the object and supported for expansion, a wedge mandrel shiftable relative to the body to expand the slips, an upper mandrel secured to the string and entering the upper end of the body, means for connecting the body, wedge mandrel and slips against relative turning, inclined parts carried by the mandrels, pitched in the opposite direction to the threads of the object, operable by rotation of the string to move the wedge mandrel to expand the slips and thereafter releasably holding the wedge mandrel in the position where the slips are expanded, said inclined parts serving to return the wedge mandrel upon rotation of the string in the other direction so that the slips may contract, and lug and notch means on the body and upper mandrel engageable by relative vertical movement between the body and upper mandrel for the transmission of torque whereby the slips may be unthreaded from the object.

12. A pin tap useful in recovering a threaded-together object from a well and adapted for use on a fishing string, the pin tap comprising a tubular body, tap slips on the lower portion of the body adapted to thread into the object and supported for expansion, a wedge mandrel shiftable relative to the body to expand the slips, an upper mandrel secured to the string and entering the upper end of the body, means for preventing relative turning between the body, wedge mandrel and slips, a tubular member receiving the opposing end portions of the mandrels, working threads connecting the mandrels with the member operable upon rotation of the string to shift the wedge mandrel for the expansion and contraction of the slips and operable to transmit rotation in one direction to thread the slips in the object and to back off the connections of the object, and means on the body and upper mandrel engageable for the transmission of rotation in the other direction to unthread the slips from the object.

13. A pin tap useful in recovering a threaded-together object from a well and adapted for use on a fishing string, the pin tap comprising a tubular body, tap slips on the lower portion of the body adapted to thread into the object and supported for expansion, a wedge mandrel shiftable relative to the body to expand the slips, an upper mandrel secured to the string and entering the upper end of the body, means for preventing relative turning between the body, wedge mandrel and slips, a tubular member receiving the opposing end portions of the mandrels, working threads connecting the mandrels with the member operable upon rotation of the string to shift the wedge mandrel for the expansion and contraction of the slips and operable to transmit rotation in one direction to thread the slips in the object and to back off the connections of the object, means for conducting circulation fluid through the mandrels to the object, and means on the body and upper mandrel engageable for the transmission of rotation in the other direction to unthread the slips from the object.

14. A pin tap useful in recovering a threaded-together object from a well and adapted for use on a fishing string, the pin tap comprising a tubular body, tap slips on the lower portion of the body adapted to thread into the object and supported for expansion, a wedge mandrel shiftable relative to the body to expand the slips, an upper mandrel secured to the string and entering the upper end of the body, means for preventing relative turning between the body, wedge mandrel and slips, a tubular member receiving the opposing end portions of the mandrels, working threads connecting the mandrels with the member operable upon rotation of the string to shift the wedge mandrel for the expansion and contraction of the slips and operable to transmit rotation in one direction to thread the slips in the object and to back off the connections of the object, the threads allowing vertical movement of the upper mandrel relative to the body, and clutch parts on the body and upper mandrel engageable by relative vertical movement for the transmission of rotation in both directions.

15. A well tool for use on a fishing string and adapted to engage in an opening in an object in the well, the tool comprising a set of slips for engaging in said opening, a body element carrying the slips, a wedge mandrel operable by vertical movement relative to the slips to expand the slips in said opening, means operable by rotation of the string for actuating and retracting the wedge mandrel, and means for transmitting rotation from the string to the slips independently of the last named means.

16. A pin tap useful in recovering a threaded-together object from a well and adapted for use on a fishing string, the pin tap comprising a tubular body, tap slips on the lower portion of the body adapted to thread into the object and supported for expansion, a wedge mandrel shiftable relative to the body to expand the slips, an upper mandrel secured to the string and entering the upper end of the body, a tubular member receiving the opposing end portions of the mandrels, and pairs of mating threads on the mandrels and member pitched in the opposite direction to the threads of said object and operable by rotation of the string to cause movement of the wedge mandrel to expand and contract the slips, one pair of threads being of steep helical pitch to prevent locking of the threads when the mandrels and member are subjected to heavy torsional strains.

17. A pin tap useful in recovering a threaded-together object from a well and adapted for use on a fishing string, the pin tap comprising a tubular body, tap slips on the lower portion of the body adapted to thread into the object and supported for expansion, a wedge mandrel shiftable relative to the body to expand the slips, an upper mandrel secured to the string and entering the upper end of the body, a tubular member receiving the opposing end portions of the mandrels, and pairs of mating threads on the mandrels and member pitched in the opposite direction to the threads of said object and operable by rotation of the string to cause movement of the wedge mandrel to expand and contract the slips, one pair of threads being of steep helical pitch to prevent locking of the threads when the mandrels and member are subjected to heavy torsional strains, the other pair of threads being of lesser helical pitch to provide great mechanical advantage for the expansion of the slips.

ORA A. BROWN.